United States Patent [19]
Goff

[11] 3,996,838
[45] Dec. 14, 1976

[54] DIVERTER VALVE FOR POWER STEERING WITH POWER BEYOND

[75] Inventor: Raymon L. Goff, Lafayette, Ind.

[73] Assignee: TRW Inc., Cleveland, Ohio

[22] Filed: June 4, 1975

[21] Appl. No.: 583,591

[52] U.S. Cl. .................................. 91/32; 91/6; 91/413; 137/110
[51] Int. Cl.² .................................. F15B 13/04
[58] Field of Search .................. 91/33, 32, 413, 6; 137/110

[56] References Cited

UNITED STATES PATENTS

| | | | |
|---|---|---|---|
| 2,633,153 | 3/1953 | Gunn | 91/33 |
| 2,745,499 | 5/1956 | Berninger | 91/33 |
| 3,253,613 | 5/1966 | Richolt | 91/6 |
| 3,260,165 | 7/1966 | Larsen | 91/33 |
| 3,452,543 | 7/1969 | Goff | 60/384 |
| 3,481,147 | 12/1969 | Goff | 60/384 |
| 3,513,751 | 5/1970 | Escobosa | 91/33 |
| 3,568,868 | 3/1971 | Chichester | 91/412 |
| 3,712,176 | 1/1973 | Meyers | 91/6 |
| 3,834,278 | 9/1974 | Goff | 91/413 |

Primary Examiner—Martin P. Schwadron
Assistant Examiner—Abraham Hershkovitz

[57] ABSTRACT

Apparatus for use in a vehicle having a hydraulically actuated steering mechanism and a hydraulically actuated implement. The apparatus comprises a housing, which includes a fluid inlet port, first and second working ports, for connection with the steering mechanism, a fluid return port and an auxiliary port for connection with the implement. A metering mechanism is located in the housing, and a first valve is movably located within said housing. The first valve has a neutral position communicating the inlet with said auxiliary port and blocking the inlet from said first and second working ports. The valve also has first and second actuated positions communicating said inlet port with said metering unit and communicating flow from the metering unit to said first or second working ports respectively. The valve further has surfaces blocking communication with the first and second working ports progressively restricting communication from the inlet to the auxiliary port and progressively increasing communication between the inlet and the first and second working ports as the valve is moved from said neutral position. The apparatus further includes a control valve for directing fluid to the implement when said first valve blocks flow of fluid to the auxiliary port.

7 Claims, 4 Drawing Figures

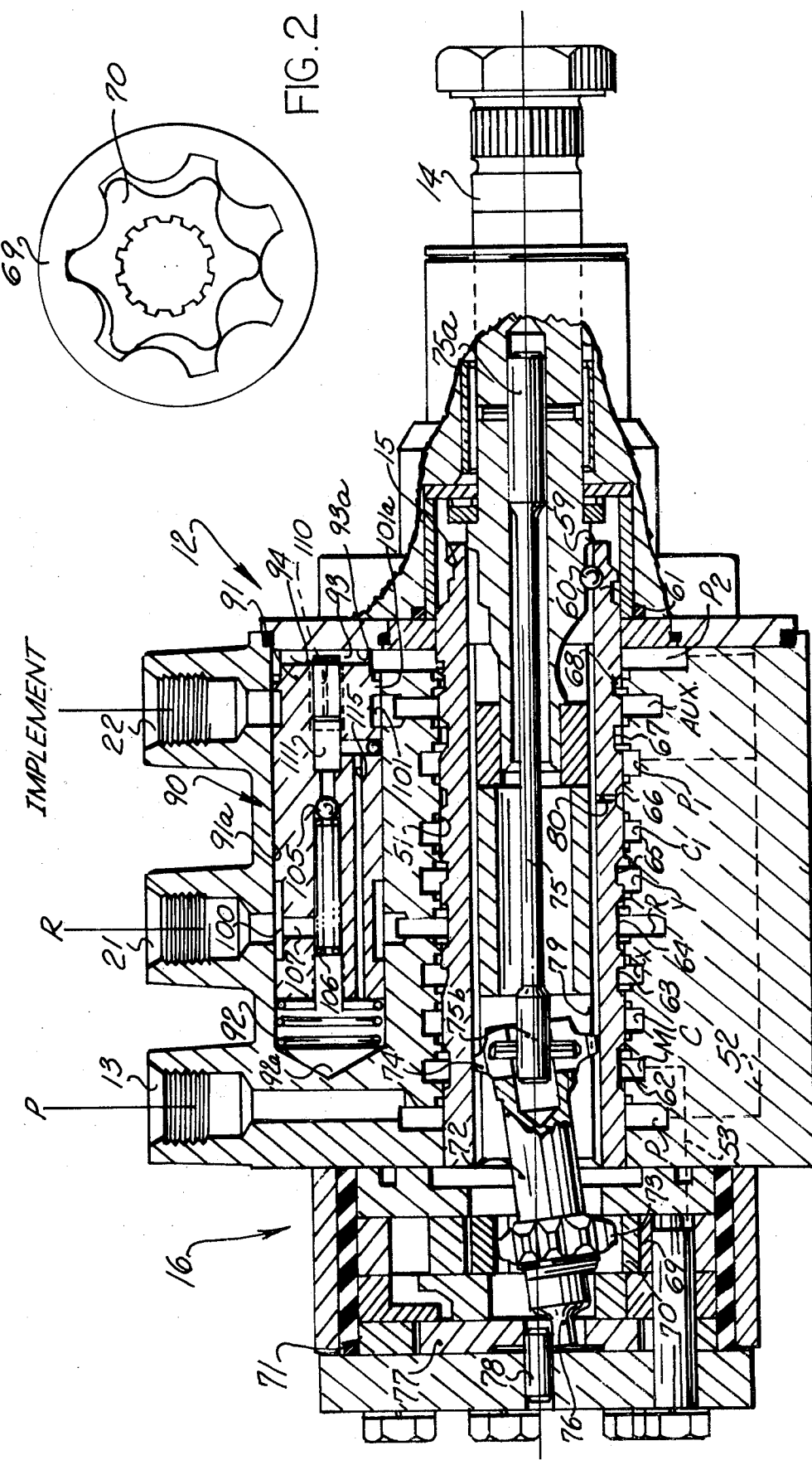

DIVERTER VALVE FOR POWER STEERING WITH POWER BEYOND

BACKGROUND OF THE INVENTION

The present invention relates to the field of vehicle power steering systems, and more particularly to a power steering system having a power fluid pump, a hydraulic cylinder for moving the steering wheels of the vehicle and a fluid controller between the pump and the hydraulic cylinder for controlling the flow of pressurized fluid therebetween. More specifically, the present invention relates to a power steering system which is associated with a hydrualic system for controlling an implement on the vehicle.

Hydraulic systems which utilize a single fluid pump to supply fluid to a steering mechanism, as well as to an implement, are known, and primarily such systems have been constructed so that the steering function has priority over the operation of the implement. Priority valves for use in such combined systems are known. Such priority valves normally operate in response to a demand from the steering control to restrict the flow of fluid to the implement.

In U.S. Pat. No. 3,834,278, a combined steering and implement actuating hydraulic system is disclosed. In that patent, the fluid controller is constructed so that flow to the implement is through the steering controller. Specifically, the fluid controller in the patent is of a type which utilizes a valve which moves in response to the steering action. As the valve moves in response to the steering action, the fluid flow to the auxiliary circuit, such as to the implement, pinches off as the valve increasingly opens the fluid flow path to the steering circuit. Consequently, the main power steering system always has priority over the auxiliary circuit so far as the pressurized fluid being supplied by the power fluid pump is concerned. Conequently, the operator has optimum control of the power steering system, regardless of whether the auxiliary circuit is being actuated simultaneously, since in all circumstances movement of the valving mechanism from its neutral position can pinch off flow to the auxiliary circuit and the degree of pinching off is proportional to the distance by which the valve mechanism moves from its neutral position.

In the system disclosed in U.S. Pat. No. 3,834,278 no flow of fluid to the implement or auxiliary circuit can occur when the steering valve is in a position completely blocking off flow of fluid to the implement. Accordingly, that system when applied to a farm tractor, for example, would operate so that when turning at the end of a field, the tractor wheels could be in a full-travel position and the steering valve would be in a fully-actuated position it would not be possible to lift an implement on the tractor while making the turn.

SUMMARY OF THE PRESENT INVENTION

The present invention is directed to an improvement in the system shown in U.S. Pat. No. 3,834,278. Specifically, the present invention is directed to an improvement where fluid can be directed to the auxiliary hydraulic circuit when the steering valve is closed. As a result, for example, the implement in the auxiliary circuit can be operated when short turns are being made. Accordingly, when applied to a tractor while making a short turn at the end of the field the implement can be raised.

More specifically, the present invention is directed to a hydraulic controller of the type generally shown in U.S. Pat. No. 3,834,278 where a control valve is interposed in the system and specifically is located in the housing of the hydraulic controller containing the steering valve. The control valve comprises a valve spool which shifts in response to differential forces acting thereon. The valve spool is provided with a groove which communicates with an outlet or auxiliary port in the hydraulic conroller and which groove directs fluid to the implement. Also, the housing is provided with a structure which defines a chamber for fluid pressure to act on one side of the valve spool, and the valve spool carries a relief valve and an orifice.

When the relief valve in response to supply pressure, fluid flows through the orifice and causes a pressure drop between a chamber communicating with the supply pressure and the chamber located on the opposite end of the valve spool. As a result of the pressure differential across the valve spool, the valve spool will shift and communicate fluid from the supply pressure chamber directly to the auxiliary system, even though the steering valve may be in a closed position blocking flow to the auxiliary system.

Accordingly, the structure has advantages of the system disclosed in U.S. Pat. No. 3,834,278, but additionally is constructed so as to provide for flow to the auxiliary system even though the main steering control valve is blocking flow of fluid to the auxiliary system. Further, the construction is such that in the event the steering control unit is not obtaining the desired amount of fluid pressure, the control valve spool will shift to a position blocking flow to the implement and thus the steering function does have priority over the auxiliary system in the event that such priority is necessary.

DESCRIPTION OF FIGURES

Further features of the present invention will be apparent to those skilled in the art to which it relates from the following detailed description of a preferred embodiment thereof made with reference to the accompanying drawings wherein:

FIG. 2 is a view of a portion of the hydraulic controller utilized in the system of FIG. 1;

FIG. 3 is a sectional view of the controller utilized in the system of FIG. 1.

DESCRIPTION OF A PREFERRED EMBODIMENT

Figure 1:
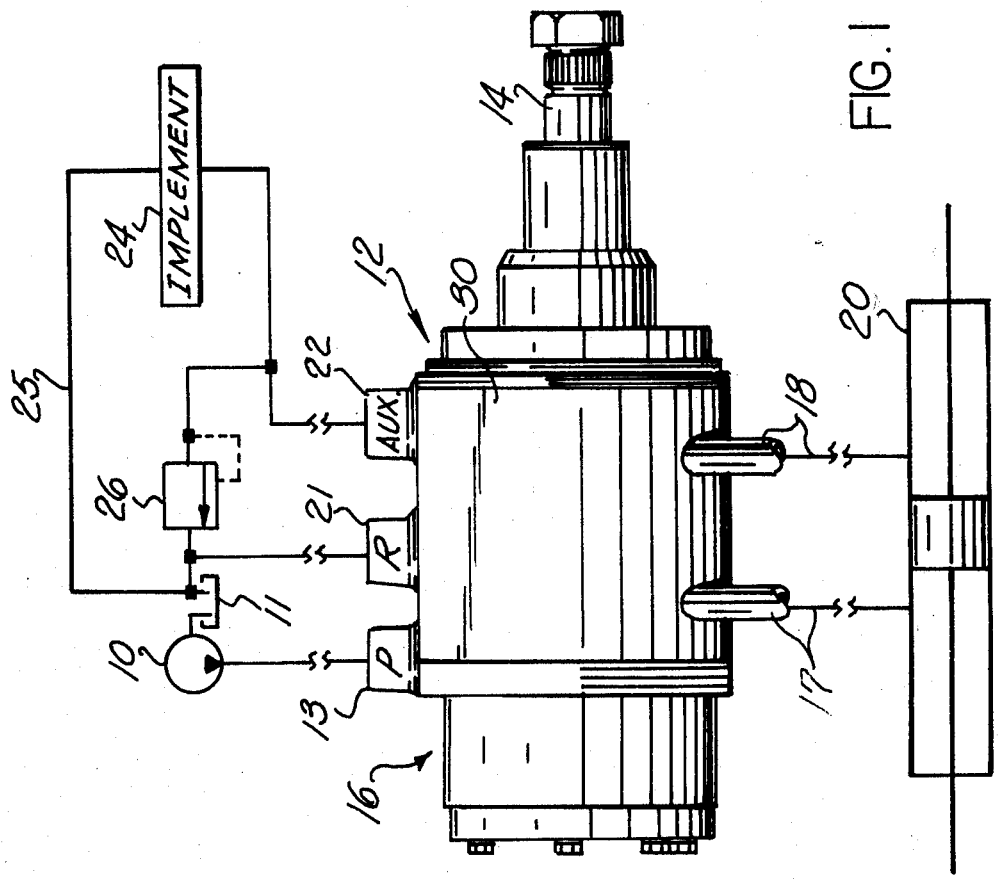
FIG. 1 is a view of a hydraulic circuit embodying the present invention.

As noted hereinabove, the present invention is directed to a hydraulic system primarily for use on vehicles having a hydraulic steering system as well as auxiliary equipment, such as a scraper blade, plow or the like which are operated in some manner through hydraulic power. The system shown in FIG. 1, in general, comprises a power steering pump 10 which directs fluid from a reservoir 11 to the inlet port 13 of a hydraulic controller 12. The hydraulic controller 12 is suitably operated by the operator of the vehicle, and specifically comprises a steering controller which is connected with the steering wheel of the vehicle.

The hydraulic controller 12 will be described in detail hereinbelow. However, in general, the hydraulic controller includes an input member or steering shaft 14 which is rotated upon turning of the steering wheel of the vehicle. The controller 12 further includes a valve sleeve or member 15 and a metering unit 16. Upon turning of the steering shaft 14, the valve member 15 will be moved, and likewise the metering unit 16 will be operated. The valve member 15 will port fluid to the metering unit, and the metering unit 16 ports the fluid back to the valve member 15 which in turn ports fluid to one of two outlets 17 or 18. The outlets 17, 18 can be termed cylinder ports and communicate through suitable conduits to opposite sides of a power steering cylinder 20. In the event that fluid exits from the cylinder port 17 to the cylinder 20, the return fluid will return through the cylinder port 18 and be ported to tank through the hydraulic controller 12 through a reservoir port 21 of the controller.

The hydraulic controller 12 is, in some respects, similar to the hydraulic controller shown in U.S. Pat. No. 3,834,278 in the sense that the hydraulic controller 12 is provided with an auxiliary port 22 which communicates with a suitable hydraulic conduit for directing fluid from the hydraulic controller 12 to an implement, generally designated 24. The implement 24 may be of any suitable construction and actuated in any suitable manner. Normally, the implement would be a scraper blade, plow or the like and would be lifted by a suitable actuator device controlled by a valve or the like, which is not shown. The implement 24, as shown schematically in FIG. 1, includes an open center valve for operating the implement, the hydraulic actuator controlled by the valve, and the implement itself. Since such constructions are well known, details thereof will not be described herein. Further as shown, flow from the implement 24 is directed to the reservoir 11 through a suitable conduit 25.

A suitable relief valve, which is a well-known structure and designated 26, is provided in the system to provide flow to the reservoir 11 in the event of a high pressure in the system immediately in advance of the implement 24. The function and operation of such relief valves are well known and will not be described in detail herein.

Referring to FIG. 3, the operating shaft 14 is journalled for rotation in a housing 30 of the fluid controller 12. The end of the operating shaft 14 which protrudes from the housing 30 is adapted for connection to a steering wheel either directly or through an extension shaft or the like. Turning the shaft 14 in one direction will result in movement of the steered wheels in one direction; whereas rotation of the operating shaft 14 in the other direction will cause the steered wheels to move in the other direction. As noted hereinabove, there is no direct mechanical connection between the operating shaft 14 and the steered wheels in the embodiment of the invention shown in the drawings.

Also formed in the housing 14 is a cylindrical bore wall 51 in which are formed a series of axially spaced circumferentially continuous grooves identified respectively from left to right as shown in FIG. 3, by reference characters P, M, C, X, R, Y, $C_1$, $P_1$, AUX and $P_2$.

Groove P communicates directly with the fluid inlet port 13. Groove R communicates directly with the fluid reservoir port 21. Grooves C and $C_1$ are connected respectively to ports 17 and 18, and groove AUX is connected to the auxiliary port 22, in a manner as will be described in detail below.

In addition, grooves P, $P_1$ and $P_2$ are interconnected by an internal fluid passageway schematically shown at reference numeral 52. Another internal passage 53 communicates groove M to the fluid metering section 16 of the fluid controller 12.

The valve spool 15 is carried in the bore 51 for axial and rotational movement. One end 59 of the valve spool 15 is coupled to the operating shaft 14 for limited relative rotation, in response to which, by means of a ball 60 riding in a helical groove 61, the valve spool 15 is shifted axially.

When the valve spool 15 is in a predetermined radial alignment with the operating shaft 14, as shown in FIG. 3, it is in a neutral position. When the operating shaft 14 is rotated in one direction from the aligned position, the valve spool 15 will shift axially in one direction from the neutral position shown. On the other hand, when the operating shaft 14 is rotated in an opposite direction, the valve spool 15 will be shifted axially in an opposite direction from the neutral position shown.

The beforementioned grooves formed in the bore wall are separated by a corresponding series of lands, and another series of grooves indicated at reference numerals 62–68 are formed in the valve spool 15. As the valve spool 15 is shifted axially from the neutral position shown, various ones of the grooves formed in the bore wall 51 are spanned by and placed in fluid communication with others of these grooves, as will be discussed further hereinbelow.

The fluid metering section 16 comprises a pair of fluid displacement members or gears 69 and 70. These gears are of the so-called gerotor type in which gear 69 surrounds gear 70 and has one more tooth than does gear 70 such that in response to relative rotation between the two gears, the axis of the inner gear 70 orbits about the axis of the outer gear 69. A commutator valving mechanism, indicated generally at reference numeral 71, serves to direct the fluid into and out of the expanding and contracting pockets between the teeth of the gears 69, 70 and is operatively connected to the inner gear 70 by means of a shaft 72. One portion 73 of the shaft 72 is connected to the inner gear 70 for joint rotation therewith while another portion 74 is connected to the valve spool 15 for joint rotation therewith. An extension 76 of the shaft 72 rotates a commutator valve member 77 about a pin 78 during operation of the gears 69, 70. The valve member 77 directs pressurized fluid from the pump to the expanding fluid pockets formed between the teeth of the gears 69, 70. High pressure fluid is communicated to the valve member 77 by fluid passages including the passage 53.

The valve member 77 also directs the fluid from the contacting fluid pockets formed between the teeth of the gear members 69, 70 and through passages formed in the fluid controller 12 including a bore 79 formed in the valve spool 15. Although the fluid displacement members 69, 70 illustrated are of the gerotor type, other metering means may be conveniently utilized. Some power systems, such as integral gear systems, do not utilize any fluid metering means whatsoever because of the direct mechanical connection between the steering wheel and the steered wheels.

A torsion rod 75 is connected fast at one end 75a to the operating shaft 14, whereas an opposite end 75b is connected fast to the shaft 72. The torsion rod 75 comprises a mechanical biasing member for constantly biasing the valve spool 15 to its neutral position relative to the operating shaft 14.

In many respects, the fluid controller 12 is similar to the controller 15 illustrated and described in Goff et al U.S. Pat. No. 3,452,543, and U.S. Pat. No. 3,834,278, both of which are incorporated herein by reference. These patents disclose additional features of the fluid controller 12 which will not be discussed in detail herein in the interest of brevity.

The operation of the fluid controller 12 may be briefly described as follows. In the neutral position of the valve spool 15 shown in FIG. 3, high pressure fluid is directed from the fluid inlet port 13 to the groove P, thence through passage 52 to grooves $P_1$ and $P_2$. From the latter grooves the fluid flow through grooves 67, 68 of the valve spool 15 to the groove AUX, and to the auxiliary port 22.

Assume now that the shaft 14 is turned in a rightward or clockwise direction as it is viewed from the right-hand end thereof shown in FIG. 2. This will cause the valve spool 15 to shift leftwardly.

After the operating shaft 14 has been rotated sufficiently, the valve spool 15 will be shifted far enough leftwardly whereby groove M will communicate with groove P through the groove 62 formed in the valve spool 15. From groove M, the high pressure fluid flows through passage 53 to the valve member 77, thence to the expanding fluid pockets between the teeth of the gears 69, 70 and thence back to the valve member 77 to the interior bore 79 of the valve spool 15, all as is known. From there, the fluid flows through a radial passage 80 formed in the valve spool 15 and thence through groove 66 to groove C1, from which it flows to the cylinder or working port 18 and thence to the steering cylinder.

The fluid returning to cylinder port 17 from the steering cylinder enters groove C, from which it flows to groove X through groove 63, and thence to groove R, through groove 64 from which it flows to the fluid outlet or return port 21.

As the pressurized fluid is communicated with gear members 69, 70, the internal gear or rotor 70 is rotated in the same direction as the shaft 14 as is the valve 15. Upon termination of rotation of shaft 14 the rotor 70 tends to rotate the valve spool 15 by means of the shaft 72 in a "follow-up" manner, (i.e., to shift the valve spool back to the neutral position vis-a-vis the operating shaft 14) as is understood by those skilled in the art.

Rotation of the operating shaft 14 in a counterclockwise direction has the effect of shifting the valve spool 15 rightwardly, as viewed in FIG. 2, from the neutral position shown. After the operating shaft 14 has rotated sufficiently relative to the spool 15, groove $P_1$ communicates with groove 66, thereby supplying pressurized fluid through the passage 80 into the interior 79 of the valve spool. From there, the pressurized fluid flows through the valve element 77 to the expanding pockets between the teeth of the gears 69, 70. The fluid flowing from between the contracting fluid pockets is delivered by the valve element 77 to the passage 53, from which it flows through groove M and groove 62 to the cylinder groove C. From the groove C, the fluid flows to the working port 17 to actuate the steering cylinder. The low pressure fluid returning from the cylinder via the cylinder port 18 flows through groove $C_1$ into groove 65, from which it flows into grooves Y and 64 to the return groove R, which communicates with the fluid return port 21.

It will be appreciated by those skilled in the art that, in situations where the power fluid pump 10 is inoperative, the fluid controller 12 may be utilized as a fluid hand pump for generating pressurized fluid to actuate the hydraulic cylinder. Thus, while there is no direct mechanical connection between the steered wheels and the steering wheel, there is a hydraulic connection, even when the power fluid pump 10 is inoperative.

In the neutral position of the valve spool 15, the groove AUX is in fluid communication with grooves $P_1$ and $P_2$ and therefore openly communicates with the auxiliary port 22. Thus fluid simply flows through the controller 12 from the inlet port 13 to the auxiliary port 22. In such circumstances, the fluid flowing from the auxiliary port 22 to the auxiliary circuit is available for operating the auxiliary implement 24 upon actuation of the valve for controlling same.

On the other hand, due to the construction and arrangement of the axially spaced grooves P through $P_2$ formed in the bore wall 51 (and the lands located therebetween) and the axially spaced grooves 62–68 formed in the periphery of the valve spool 16 (and) the lands located therebetween), the orifices formed by the interacting faces of the grooves $P_1$, AUX and $P_2$, through which fluid flows to the auxiliary port 22, are gradually "pinched off" or reduced in size as the valve spool 15 moves in either direction from its neutral position (at which all of the fluid flowing through the controller 12 flows through the auxiliary port 23) to an operating position (at which at least some of the fluid flowing through the controller 12 is directed to the steering cylinder to effect turning of the steered wheels). As a matter of fact, if the valve spool 15 is moved far enough from its neutral position toward an operating position, the orifices between the grooves P, AUX and $P_2$ are completely closed off, thus eliminating all fluid flow between this connection.

In accordance with the present invention, the hydraulic controller 12 is constructed so as to provide for flow of fluid to the auxiliary port 22 and to the implement 24, even though the steering control valve 15 is in the position where flow is blocked from the ports $P_1$, $P_2$ to the auxiliary groove. In this connection, a control valve, generally designated 90, is provided in the controller. The control valve 90 basically includes a valve spool 91 located in a bore 91a in the hydraulic controller 12. The valve spool 91 is biased to the right, as shown in the drawings, by the spring 92 located in a chamber 92a. In its extreme rightward position, the valve spool 91 has a portion or projection 93 which engages or abuts the surface 93a of the housing so as to provide a chamber 94 located at the right end of the valve spool 91. The chamber 94 communicates with the supply pressure in groove $P_2$.

The valve spool has a pair of axially spaced, circumferentially extending grooves 100, 101. The groove 100 communicates with the reservoir port 21 and also communicates with the groove R in the bore wall 51. The groove 100 is of such an axial length that in all positions of the valve spool 91 fluid communication is maintained thereby between the groove R and the return port 21. The axial length of the groove 101 is such that in the position shown in FIG. 3 in which the spool 91 is biased toward the right, in what could be termed a de-actuated condition, fluid which is communicated to the auxiliary groove AUX is in turn communicated with the groove 101 and is communicated thereby to the auxiliary port 23. Accordingly, in the position shown in FIG. 3, the control valve 90 does not interfere with either flow of fluid to the groove R or flow of fluid from the auxiliary groove AUX to the port 22. Therefore, in the position illustrated in FIG. 1 the operation of the controller is precisely as described above.

However, in the event that it is desired to operate the implement 24 and the power steering valve 15 is in a position blocking flow of fluid to the AUX groove from P, or P₂ and sufficient pressure exists from the pump 10 to provide for the operation of the implement 24, the pressure in chamber 94 will increase to cause a relief valve 105 carried by spool 91 to open against the bias of a spring 106. When the relief valve 105 moves to the left against the bias of the spring 106, fluid flows from the chamber 94 through an orifice 110, a passageway 111, and past the valve 105 to a radially extending passage 107 which communicates with the groove 100. When that flow of fluid begins, a pressure drop is established across the orifice 110, with the pressure in the passageway 111 being lower than the pressure in the chamber 94. The passageway 111 communicates through an axially extending passageway 115 with the chamber 92a where the spring 92 is located. Accordingly, since a flow condition exists, the pressure in chamber 92a reduces and as a result the valve spool 91 can shift to the left under the force of the pressure in the chamber 94.

Figure 4:
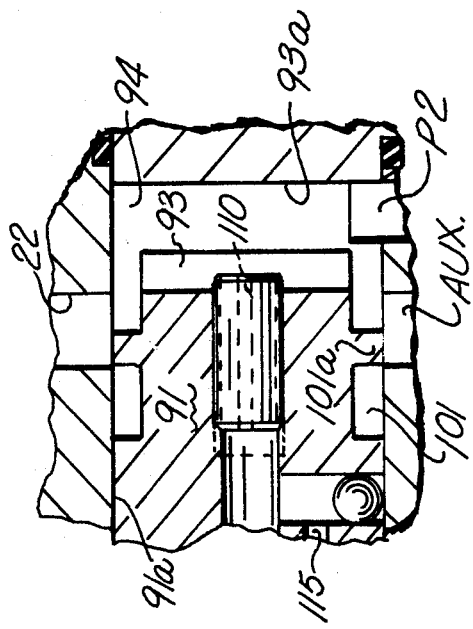
FIG. 4 is a sectional view of a portion of the controller of FIG. 1 in an operative position.

When the valve spool 91 shifts to the left (see FIG. 4) under such conditions and the movement of the valve spool is sufficient to cause a land 101a to pass beyond the auxiliary port 22, flow can then be directed from the chamber 94 directly into the auxiliary system, even though the steering control valve 15 is in a position blocking flow from chamber 94 to the AUX groove. Accordingly, under such conditions, the implement 24 can be operated, even though the power steering valve spool 15 is located in the blocking position.

This function is important, due to the fact that in many operations the steering valve spool 15 may be in an extreme position and yet it is still necessary to operate an implement included in the system. For example, it is common on a farm tractor when turning at the end of a field to lift an implement while making the turn. Accordingly, when such a maneuver is being made with the present system and the steering valve spool 15 blocks flow to the auxiliary system, the control valve 90 can act in order to bypass the steering valve 15 and direct fluid directly to the auxiliary system from chamber 94 so that the implement 24 can be operated.

Further, in the event that such action is occurring but that operation of the implement starves the steering system or results in a lack of pressure being applied for purposes of steering, the system will operate to give priority to steering. In such a case the steering shaft 14 is turning, and the metering unit 16 is being turned thereby. Accordingly, the pressure in the chamber 94 will reduce, due to the fact that the metering mechanism 16 is attempting to draw fluid into it, but it is in effect being starved by the lack of supply pressure. When such a condition occurs, the reduction in pressure in the chamber 94 will cause the valve spool 91 to shift to the right under the influence of the spring 92 and the pressure in the chamber 92a. When this occurs, the flow of fluid to the auxiliary system will then be blocked by the valve spool 91, even though at that time the valve spool 15 may also be in a position blocking flow to the auxiliary system. Accordingly, the present invention does provide for flow of fluid to the implement in the event that the steering control valve spool 15 is in a blocking position, but yet at the same time does provide for priority to the steering system in the event that the steering system is not receiving sufficient fluid for purposes of actuation thereof when the implement is being operated.

Further advantages and features of the present invention will be apparent to those skilled in the art, and it is intended to cover all such modifications and changes which come within the scope of the present claims.

Having defined my invention, I claim:

1. Apparatus for use in a vehicle having a steering mechanism and comprising a housing, said housing including a fluid inlet port, a fluid return port and an auxiliary port for fluid connection with an implement, a first valve movably located within said housing and having a neutral position communicating the inlet port to the auxiliary port, said first valve having first and second operative positions communicating said inlet with the steering mechanism to effect steering in different respective directions and said valve progressively restricting communication from the inlet port to the auxiliary port and progressively increasing communication between the inlet port and the steering mechanism as said first valve is moved from said neutral position, means normally biasing said first valve to the neutral position, a valve actuator operatively associated with said valve for moving said valve from the neutral position to the operative positions, and a second valve in said housing for communicating fluid to said auxiliary port from said inlet port when said first valve blocks fluid flow to said auxiliary port and pressure exists for actuating the implement, said second valve comprising a valve element movable in a bore in said housing, said housing defining a chamber in communication with said fluid inlet port, said valve element having surfaces against which the pressure in said chamber acts, and said valve being movable to communicate the pressure in said chamber with said auxiliary port.

2. Apparatus as defined in claim 1 wherein said valve element comprises a spool member which carries a relief valve, said relief valve communicating with said return port and opening in response to pressure in said chamber, said spool further having an orifice in the passageway between said chamber and said return port, flow through said orifice creating a pressure drop, and means for applying the pressure drop to said valve spool to effect shifting movement thereof to communicate fluid from said chamber to said auxiliary port.

3. Apparatus as defined in claim 2 wherein said valve spool has a spring acting to bias said valve in opposition to the pressure in said chamber and wherein the pressure on the low pressure side of said orifice is communicated to act in conjunction with said spring.

4. Apparatus as defined in claim 3 wherein said means communicating said lower pressure to said chamber comprises a passageway located downstream of said orifice and said orifice being located between said relief valve and said chamber.

5. Apparatus for use in a vehicle having a hydraulically actuated steering mechanism and a hydraulically actuated implement, said apparatus comprising a housing, said housing including a fluid inlet port, a fluid return port and an auxiliary port for connection with the implement, a metering mechanism located in said housing, a first valve movably located within said housing and having a neutral position communicating the inlet with said auxiliary port, said valve having first and second actuated positions communicating said inlet port with said metering unit and communicating flow from the metering unit to the steering mechanism, said valve including surfaces blocking communication with the steering mechanism and progressively restricting communication from the inlet to the auxiliary port and progressively increasing communication between the inlet and the steering mechanism as the valve is moved from said neutral position, and a second valve for directing fluid to the implement when said first valve blocks flow of fluid to said auxiliary port, said second valve comprising a valve element movable in a bore in said housing, said housing defining a chamber in communication with said fluid inlet port, said valve element having surfaces against which the pressure in said chamber acts, said valve being movable to communicate the pressure in said chamber with said auxiliary port.

6. Apparatus as defined in claim 5 wherein said valve element comprises a spool member which carries a relief valve, said relief valve communicating with said return port and opening in response to pressure in said chamber, said spool further having an orifice in the passageway between said chamber and said return port, flow through said orifice creating a pressure drop, and means for applying the pressure drop to said valve spool to effect shifting movement thereof to communicate fluid from said chamber to said auxiliary port.

7. Apparatus as defined in claim 6 wherein said valve spool has a spring acting to bias said valve in opposition to the pressure in said chamber and wherein the pressure on the low pressure side of said orifice is communicated to act in conjunction with said spring.

* * * * *